July 18, 1944.  D. E. BATESOLE ET AL  2,353,988
SEAL FOR ANTIFRICTION BEARINGS
Filed April 20, 1942  2 Sheets-Sheet 1

INVENTORS
DWIGHT E. BATESOLE
GEORGE H. KENDALL
BY
C. P. Goepel
ATTORNEY

July 18, 1944. D. E. BATESOLE ET AL 2,353,988
SEAL FOR ANTIFRICTION BEARINGS
Filed April 20, 1942 2 Sheets-Sheet 2
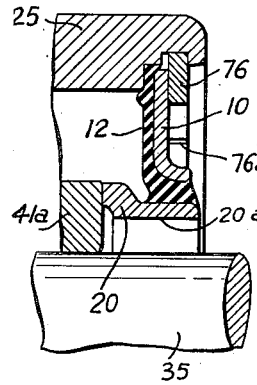
FIG.7.
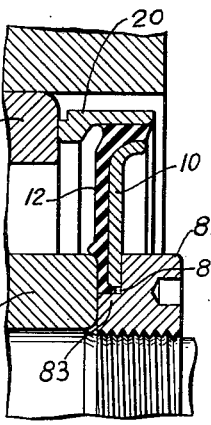
FIG.8.
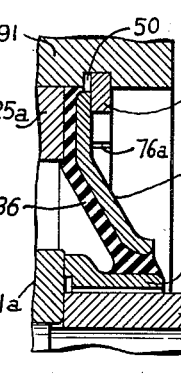
FIG.9.
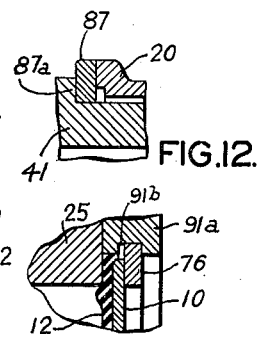
FIG.12.
FIG.10.
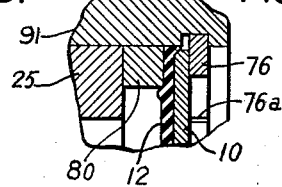
FIG.11.
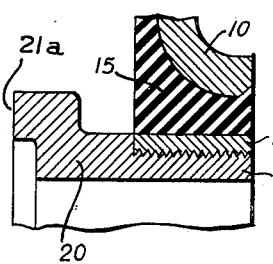
FIG.13.
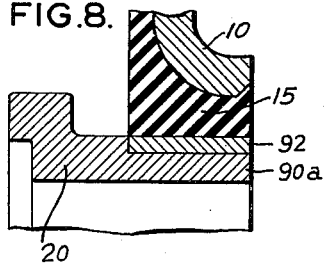
FIG.14.
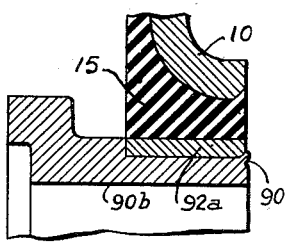
FIG.15.
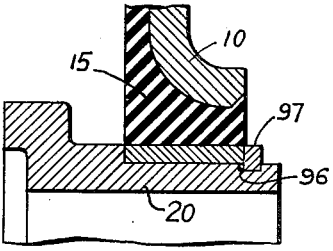
FIG.16.
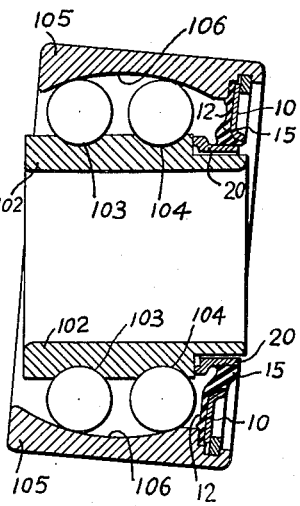
FIG.19.
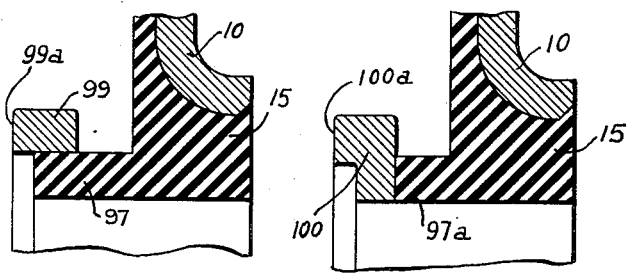
FIG.17. FIG.18.
INVENTORS
DWIGHT E. BATESOLE
GEORGE H. KENDALL
BY
C. P. Goepel
ATTORNEY Patented July 18, 1944

2,353,988

UNITED STATES PATENT OFFICE 2,353,988

SEAL FOR ANTIFRICTION BEARINGS

Dwight E. Batesole, Glenbrook, and George H. Kendall, Noroton Heights, Conn., assignors to Norma-Hoffmann Bearings Corporation, Stamford, Conn., a corporation of New York Application April 20, 1942, Serial No. 440,042

4 Claims. (Cl. 286—11)

This invention relates to seals for antifriction bearings, and more particularly to the type known as the balanced fluid pressure type.

The object of the invention is to provide a unitary member acting as a dust excluding seal, a lubricant holding seal, and a fluid pressure seal, and to solve certain problems attendant each of them, and to so arrange them that each acts on the others when disposed to cooperate with a ball bearing to produce a novel and different result by their co-joint action.

The improved seal is made a part of an antifriction member, and spans the space on one side of the antifriction member from racering to racering. It may be applied to either side of the antifriction member, or two seals may be applied, one at each side of the antifriction members, to provide a completely enclosed unit, especially useful in the food and chemical industries, preventing contamination from leaking oil. The improved seal is fluid proof throughout, and remains so even with variations of the pressure of the fluid which acts upon the seal. In addition, in the prepared form the improved seal acts under slight differential or balanced pressure, and the control of the rubbing temperature is maintained because a low pressure acts on the rubbing surfaces irrespective of the extent of the fluid pressure being sealed against, and the seal allows for various movements of the bearing parts during rotation, also compensating for any axial movement of the bearing. In addition the seal is easily removable and replaceable.

The invention consists of a unitary member consisting of a relatively rigid movement-resisting ring secured to one racering, a rigid axially movable fluid pressure member in clearance relation with the other racering, and a relatively resilient rubber like connector disposed between the two rigid members, these three members as a unit spanning the space between the raceings, said connector being in shear stress throughout. Such a unitary seal having such different characteristics when applied to a ball or roller bearing meets the conditions of high pressure working, and actual fluid sealing, in that a movable fluid sealing device acts on a racering and a stationary fluid sealing device is arranged at the other racering, each fluid seal preventing the passage of fluid.

The invention will be more fully described hereinafter, embodiments thereof shown in the drawings, and the invention will be finally pointed out in the claims.

In the accompanying drawings,

Figs. 7 to 9 are central sections, showing different applications of the improved three-part seal or parts thereof;

Figs. 10 and 11 show, fragmentary, different applications of the outer racering sealing device;

Fig. 12 shows, fragmentary, one form of an inner racering sealing device, using a spacer member;

Figs. 13 to 18 are central sections, fragmentary, of different forms of an inner racering sealing device; and Fig. 19 is a central section of a self aligning ball bearing with the improved seal applied thereto, at one side thereof, which may be applied equally well to the other side, or to both sides.

Similar characters of reference indicate corresponding parts throughout the various views.

Figure 2:
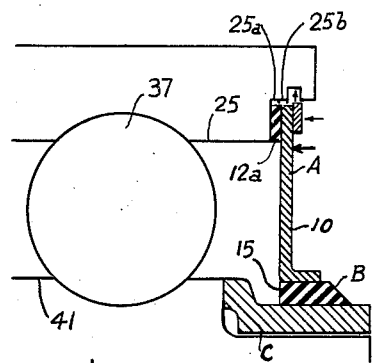
Fig. 2 is a diagrammatic drawing of the concept underlying the improved seal shown in Fig. 1.
Figure 3:
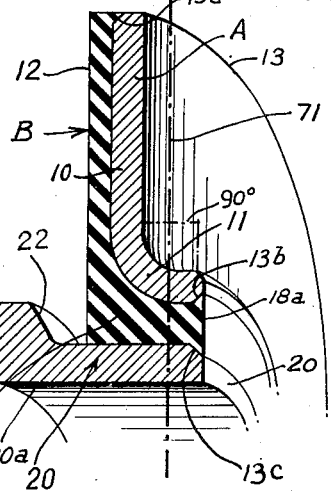
Fig. 3 is a transverse section of the improved three-part seal, with part in perspective, shown separate from an antifriction bearing.

Referring to the drawings, and more particularly to Figs. 2 and 3, there is shown the improved seal, consisting generally of three parts, A, which is a relatively rigid washer; B, which is a rubber or synthetic rubber and consequently a relatively yieldable connector, and C, which is a rigid axially movable and self aligning member.

The part 10 is a ring or washer of relatively rigid metal and is formed to provide a curved end 11 bent on a curve of about 90°, the free end of the curved portion providing a circular opening for an axially movable and self aligning member 20 and a shear mounted rubber member 15.

Bonded to one face of the metal washer 10 is a rubber or synthetic rubber connector 12, either in one integral piece as in Fig. 3, or in two parts as in Fig. 2. The part B includes a laterally extending shear member 15. The outer peripheral end 13 of the metal washer 10 is formed into a tapered or chamfered end portion 13a to permit the flow of rubber over it. This part 13a may be curved, but a tapered or inclined or chamfered portion enables a freer flow of the rubber. The inner end of the metal ring 10 is also chamfered or rounded at 13b. The metal ring 10 and rubber connector 12, are bonded together along the entire adjacent faces of the members, in the form shown in Fig. 3. In the form shown in Fig. 2, a rubber layer 12a is bonded to one side of the metal ring 10, and a shear member 15 of rubber is bonded to the inner end of the metal ring 10.

To the lower end of the rubber connector 12 at its lowermost side there is bonded the rigid and metallic axially movable member 20 which forms a part of a pressure sealing device. Thus, the member 20, the connector 12 and the rigid washer 10 by this bonding form one unitary member, as shown in Fig. 3, before being applied to a bearing.

The rubber connector 12 has an enlarged portion 18a to abut against the chamfered end portion 13b of the ring 10, and against a chamfered end portion 13c of the member 20. The chamfered portion 13b corresponds roughly to the chamfered part 13c but these are in reverse direction. These chamfers prevent tearing of the rubber under heavy shear loading. At its outer end the rubber connector is adapted to engage the chamfered end 13a of the washer 10. Without this chamfer the rubber would tend to shear off. The outer peripheral portions of the ring 10 and connector 12 are flush with each other. The thickness of the rubber connector 12 along the ring 10 is about equal, the drawings showing the thickness of the connector 12 slightly less than the thickness of the ring 10. The part 11 being curved provides a relatively large bearing surface, and the shear member 15 at its upper side contacts with this large surface, and the shear member 15 at its lower side has also a relatively large surface where it contacts with the member 20. These metallic surfaces of the ring 10 and member 20 where they contact with the connector 12 are preferably roughened or rough ground, so as to provide good adhesion for the bonding action. The shear member 15 of the connector 12 is of such thickness or depth to permit a shear loading action, in contrast to a compression loading action of the rubber, which compression action is desired to be minimized or obviated as much as possible. The shear member 15 acts on the one hand to connect the movable member 20 to the rigid member 10, so as to provide a continuous barrier, and in this sense the smallest amount of rubber would be sufficient. But the member 15 must also permit the lateral movement to and fro of the member 15. In consequence the minimum thickness of rubber would not be sufficient. Therefore, the minimum sufficient for a mere bonding intermediately is increased to an extent to take up shearing strains due to the lateral movement of the member 15 in relation to the relatively fixed rigid member or ring 10. A greater thickness is not necessary.

The sealing member 20 has a nose-like projection 21 extending from its neck portion 22, which has a lower recessed portion 24 and also has a sealing face 21a. The member 20 has a bore 20a clearing the land 33a of the bearing shown in Fig. 1. The initial relationship of the three parts, A, B and C, each just described in detail, is shown in Fig. 3, that is prior to the time when the improved seal is applied to a bearing.

Figure 1:
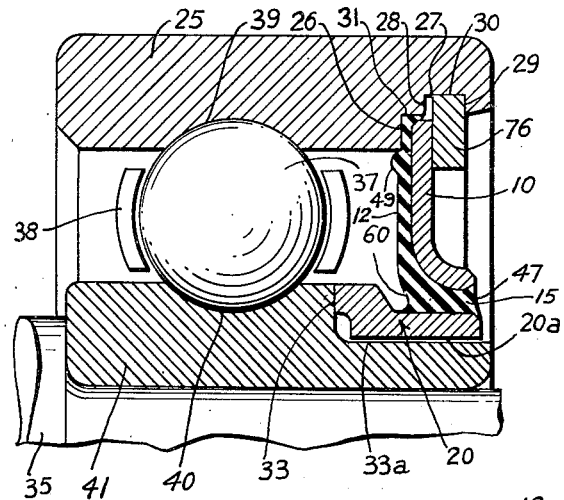
Fig. 1 is a central transverse section of a ball bearing having the improved three-part seal applied thereto.

The three part seal composed of the components A, B and C, is now applied to an antifriction or ball bearing as shown in Figure 1.

The usual outer racering 25 of the ball bearing shown in Fig. 1, has a grooved portion of different parts, first a radial shoulder 26, then an axial wall 31, then a recess 27 formed by two shoulders 28 and 29 with a bottom 30 therebetween. The usual inner racering 41 has a radial shoulder 33. The inner racering 41 has a sub-caliber cylindrical portion or land 33a, with which the bore 20a is substantially concentric. The ball 37 and its adjacent number of balls are held spaced in the usual manner by the usual cage 38, while rolling between the outer and inner races 39 and 40. In the drawings, Fig. 1, the inner racering is secured to a shaft 35, and rotates therewith.

Figure 4:
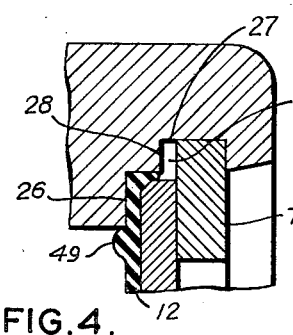
Fig. 4 is an enlarged fragmentary section of the outer part of the improved seal showing one sealing device, to illustrate the flow of rubber into a space made available for that purpose.

When the three part seal is applied to such a ball bearing, the outer peripheral end of the improved seal is so placed that the surface of the rubber connector abuts against the shoulder 26, and on the surface of the metal ring 10 is then placed a spacer 76 which is split, and its outer periphery is then inserted into the recess 27. This spacer 76 then abuts against the bottom 30 and wall 29. The pressure exerted by the spacer 76 upon the ring 10, causes the ring 10 to press the rubber connector extending along the wall 26, and the rubber is caused to flow into the form shown in Fig. 1, from that shown in Fig. 3. An enlarged view of this flow action is shown in Fig. 4, and in Fig. 2 is shown the rubber before its flow, Fig. 2 also showing the provision of the chambers 25a and 25b, for the flow action of the rubber. Thus, the peripheral margin of the rigid ring 10 acts to form a dishlike peripheral margin in the rubber connector, and thereby a sealing device is provided, which absolutely prevents any passage of liquid. Such flow of rubber provides also an enlargement 49 (Fig. 4) which provides a hugging action against the outer racering 25, also taking its part in preventing entrance of fluids between the rubber enlargement and adjacent outer racering. The reservoir space 50 permits a further flow or movement of the rubber. The essential feature is the pressure exerted upon the rubber to form a peripheral dish-like marginal portion to flow into the corner formed by the radial wall 26 and axial wall 31 with a pressure exerted generally diagonally of the angle so formed, in addition to the axial pressure against the radial wall 26 and the radial pressure chamfered surface 13a aiding in distributing the pressure forces described which components are resolved from the pressure action of the spacer 76 upon the ring 10. These actions are important as due to same, a fluid sealing device is provided at the peripheral portion of the improved seal.

The other end of the rubber connector 12, namely the shearing member 15, is also squeezed and moved out of the initial position shown in Fig. 3. An inward curved like part 60 is formed as well as an inward curved like part 47 is formed. There is a shear action of the rubber extension 15. The face 21a of the movable member 20 abuts against the face of the shoulder 33 of the inner racering 41. The member 15 of the rubber ring is subjected to a shearing action, in such a way that the member 15 acts as an accumulator of resilient forces, which forces have a tendency to press the member 20 bonded thereto, towards and against the shoulder 33 of the inner racering under resilient pressure, to bring about a sealing action between the faces 21a and 33.

Figure 5:
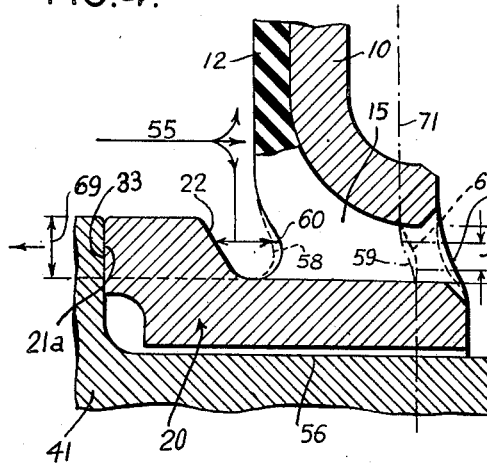
Fig. 5 is a fragmentary view of the inner part of the improved seal showing the other sealing device, to illustrate the fluid pressure action.
Figure 6:
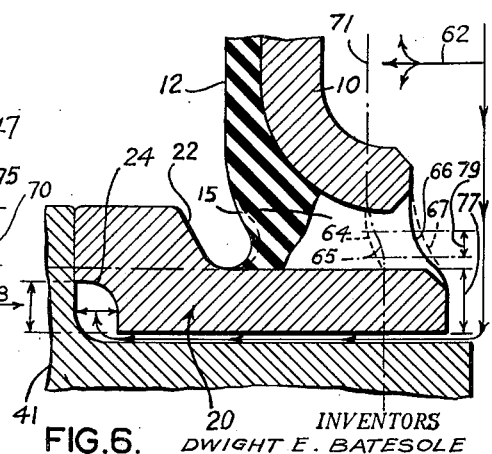
Fig. 6 is a fragmentary view with the parts of Fig. 5 in another position, and with pressure applied at the other side thereof.

In Figs. 5 and 6, there is shown diagrammatically the action of the rubber shear member 15.

Referring to Fig. 5, the fluid pressure forces are indicated by the three-part arrows 55. The dotted line 58 indicates the position of the face of the rubber when the seal ring has been offset toward the right after mounting the seal in position. The full line 60 indicates the position, after mounting the seal in position, of the surface of the rubber when internal fluid pressure has been applied against the seal unit. The pressure, of course, exerts itself against the flange 22 of the member 20 as well as against the rubber. If the rubber were perfectly elastic there would be a circumferential area 69 equal to 70 and the resiliency of the offset rubber would then be depended upon to continue to press the sealing surfaces 21a and 33 together. However, the rubber cannot be considered as retaining its full initial elasticity over a long period, especially under possible conditions of very high temperature and therefore one cannot depend entirely upon its initial resiliency to retain the seal. Also any wear of the seal would reduce the shear loading of the rubber and the pressure from the same to hold the sealing surface 21a against the inner ring shoulder 33. Consequently, if area 69 is maintained greater than 70, there will always be pressure toward the left against the flange 22 of the member 20, which pressure will hold sealing face 21a against its seat 33.

Furthermore, possible inaccuracies in the external diameter of the bronze member 20 may increase or decrease the area of the member exposed to the fluid pressure. Likewise, there are, of course, minute variables in the thickness of the rubber element between the member 20 and the ring 10 which also must be taken into consideration. It would be impossible to insure that area 69 would be exactly equal to 70 with such variations and therefore, circumferential area 69 should in all cases be greater than circumferential area 70.

To further indicate the action of the shear member 15 under shear loading caused by the flange 22 of the member 20, a dot-dash line 71 and a dot-dash line 59 have been drawn. If an exactly vertical line were inscribed on a sectioned portion of the ruber from the member 20 to the washer 10, when in its reposed or original position (as shown in Fig. 3), a line as shown as 59 would result, when the rubber is offset and when the seal is in the bearing. Then when the fluid pressure is applied a still further distortion as shown by the dotted line 61 would result. The lines 59 and 61 are not straight diagonal lines but are somewhat in the shape of an S curve with a slanting portion at the middle section and the two ends of the lines coming almost to the vertical position due to the bonding effect of the rubber surface with the rigid surfaces of rigid ring 10 and member 20. There is therefore a so-called effective or fully resilient circumferential area 75 which is less than the circumferential area 70 and of course less than the circumferential area 69. The amount that this would be less than 70 would largely be a factor of the hardness or stiffness of the rubber. The correct relationship of areas 75 and 69 are of utmost importance. If the effective area 75 is considerably less than area 69, this excessive unbalanced pressure will result in high frictional heat at the sealing surfaces causing a shortening of the seal life. On the other hand, if the area 75 is more than area 69, this negative fluid pressure exceeding the directional pressure exerted due to the shear loading of the rubber, may cause the sealing surface 21a to separate from its seat 33.

It will be immediately clear that if the rubber were perfectly flexible the maximum movable section that would result would be 70. Area 69 being greater than area 70 by a small amount provides that the sealing surface 21a of the member 20 will exert seal pressure against its seal 33 due to the differential in area when the fluid pressure is applied. Likewise, the sealing surface 21a would rub against the face of the seat 33 due to the shear resiliency of the rubber element based on its offset position.

Obviously, if area 69 is substantially greater than area 70, we will have a considerable build-up of rubbing pressure between the two sealing parts 21a and 33. This, particularly at high speed, would probably result in too much heating for satisfactory results. The heat would be transferred to the rubber resulting in fairly rapid deterioration,—so a limit is established that area 69 is to exceed area 75, but we may still find it desirable to establish that area 69 is to exceed area 70, although this of course will depend on three factors: 1: The fluid pressure itself, 2: The speed of operation, 3: The original resiliency and amount of offset of the rubber element.

In Fig. 6 there is shown the same elements, operative under external pressure as indicated by lines 62, i. e. pressure from outside of the bearing and toward the left. The same theory of operation has been worked out here except that it is now necessary to figure on a comparison of areas of the member 20 in figuring on the balanced pressure. In this case, area 77 should always exceed area 78 to insure a definite pressure between the two rubbing seal parts 21a and 33. Here again the matter of the effective area of the rubber element is indicated by 79. The surface element 67 is shown in dotted lines as it is the surface before fluid pressure has been applied. The surface 66 is shown in full lines corresponding to the surface after pressure has been applied. The lines shown at 65 and 64 are somewhat similar to those shown in the preceding illustration, except that when fluid pressure is exerted on the rubber element, it tends to move the rubber toward the left instead of right.

In addition to the pressure on the seal faces 21a and 33 caused by the difference between areas 78 and 77 in Fig. 6, we have the pressure against the flexible portion of the rubber element 79 added thereto. It is, therefore, desirable to keep the area 79 rather small in order not to build up excessive unit seal pressure under heaxy external fluid pressure. It is evident that the improved design has been made so that it can be used for external as well as internal pressure.

The theory of the action of these pressures on the various elements of the improved seal is one of the essential features of the present invention and constitutes the difference between this construction and that used in the ordinary type of so-called diaphragm type of seal for bearings. By very close relationship of the seal parts that affect the areas used to obtain an almost balanced pressure, very high fluid pressures can be taken care of without any great increase in the pressure between the rubbing parts. This means that a minimum of heat would be developed by the rubbing parts.

For extreme pressures it may be necessary to add a longer bonded portion of rubber to the washer 10 and to member 20, since the bond itself must resist this pressure and not allow the rubber to be sheared free from the rigid surfaces. Effective bonding is produced by roughened surfaces of the rigid members such as obtained by wire brushing, sand blasting, emery paper and the like.

The radially disposed thickness of the rubber is purposely kept small so that a soft material may be used and provide the required control of resiliency. Also less surface is then exposed to possible deteriorating material when used.

The sealing device action is that of a balanced seal, the seal being so made that there is always a slight but not excessive pressure tending to hold the sealing face 21a of the member 20 to the racering sealing surface. Through this action it is possible to seal against excessive fluid pressure with a minimum net pressure on the sealing surfaces. This avoids high temperature at the rubbing surfaces. The design does not need to be varied to take care of each individual fluid pressure or range of pressures but can be used universally with all pressures large or small within the bearing seal capacity.

The member 20 is made of high lead bronze. It can be made of carbon, composition or other suitable rubbing material. The rigid ring 10 can be made of metal, or plastic, or any material of sufficient stiffness to carry out the attributes described. Wherever rubber is referred to, any like material, like synthetic, is included.

Having described an embodiment of the invention, modifications of structure will now be described.

In Fig. 7 is shown an embodiment in which the movable member 20 rubs against the face of a cut off inner racering 41a. The inner ring 41a has no land and the bore 20a is spaced from the shaft 35. The parts are otherwise as described in connection with Figs. 1 and 2.

In Fig. 8 there is shown the reverse position, in which the movable member 20 acts as a face sealing device against the cut off outer racering 25a, the three parts 10, 12 and 20 being otherwise the same. A lock nut 82 is provided which has a shoulder 83 and space 83a to permit the entrance of the inner ends of the members 10 and 12, in the manner described in connection with Fig. 1.

In Fig. 9, the outer and inner racerings 25a and 41a are both cut off, and the washer 85 and bonded rubber connector 86 are inclined in order to cooperate with the cylindrical part of the movable member 20. A cylindrical sleeve 92 rests against the inner racering and is secured upon the shaft 35. A housing 91 is provided with the groove for the spacer 76 to hold the ends of the metal washer 85 and the rubber connector 86, against the outer racering 25a, the space 50 being provided as a reservoir for the flow of the rubber.

Fig. 10 shows the outer racering 25, left uncut and a separate collar 91a provided with grooves 91b for the spacer 76 to hold the washer 10 and rubber connector 12 against the racering 25. The sealing device is like the one described.

In Fig. 11, the bonded rubber connector 12 and metal ring 10 are spaced from the outer racering 25 by a collar 80 seated within the housing 91.

In Fig. 12, a spacer collar 87 is placed between a shoulder 87a of the inner racering 41 and the movable member 20, the spacer having a flat sealing surface contiguous to the sealing surface of the movable member 20.

The rubbing contact is between the adjacent faces of spacer 87 and member 20, and the spacer collar 87 is rigidly attached to the inner racering 41. The advantage of this construction is that the sealing surfaces can be readily carried out on the washer 87, and such a washer can be readily replaced by another.

In Figs. 13 to 18 various forms of movable members are shown.

In Fig. 13, the axially movable member 20 is provided with a subcaliber portion 90 which is threaded to engage the interiorly threaded portion of a sleeve 91, to the outer surface of which the rubber shear portion 15 of the connector is bonded.

In Fig. 14, the member 20 at 90a is provided with an insert 92 suitably secured to the member preferably by a press fit, the outer surface of the insert being bonded to the shear portion 15 of the connector.

In Fig. 15, the insert 92a is provided with a chamfer and 90b with a groove. The material beyond the groove radially is spun over the chamfer at 90c to hold 92a securely to 90b.

In Fig. 16, the insert is shortened, and a recess 96 is provided in the member 20, and a locking ring 97 inserted.

In Fig. 17, an extension 97 is made part of the shear member 15 and then has bonded thereto, a sealing member 99 having a sealing surface 99a.

In Fig. 18, a similar construction is shown, the sealing member 100 having an angular configuration, which is applied to the extension 97a, the sealing surface being at 100a.

In Fig. 19, a self aligning bearing is shown in which the inner racering 102 has two raceways 103 and 104, and the outer racering 105 has an outer raceway 106. The sealing construction is generally that of Fig. 1. It will be noted that at one side of the bearing the rubber shear member 15 is radially compressed yet maintaining its shear action, and at the diametrically opposite end the shear member 15 is radially extended, as at the lower part of Fig. 19. The sealing device due to the flow of rubber acts at the outer raceway to prevent the flow of fluid, and the sealing device of the contacting flat surfaces at the inner racerings act to seal against the flow of fluids, the shear action being maintained throughout.

The rubber itself is in a condition of light shear which is the best condition to give a maximum lateral movement of the sealing element without appreciable build-up of loading pressure on said sealing element and also compensates for wear. The seal can compensate for misalignment of the inner and outer rings of the bearing and also absorbs vibrations generated between the raceways thereby making for more quiet operation.

The efficiency of the relatively moving sealing surfaces within the bearing is largely dependent upon the following factors:

*a*: The harder surface is greater or wider radially than the softer rubbing surface so that it overlaps the softer surface.

*b*: The harder rubbing surface is so finished as to provide a continuous uninterrupted flat plane generally concentric with the axis of rotation.

*c*: The softer rubbing surface likewise has a continuous uninterrupted flat plane generally concentric with the axis of the bearing.

*d*: Any deviations from the flat plane surface in either the harder or softer element should be entirely below said flat plane and with no projections above the flat plane. Such flat surfaces are produced by such operations as microhoning, superfinishing, stone lapping and the like, and on softer materials by diamond facing and the like. The continuous contact of opposed surfaces of this kind, prevents fluid from passing therethrough, and as the pockets in said surfaces are not interconnecting, the fluid is kept in the pockets, and does not pass through into a container channel. The plane of the improved seal is parallel with the plane of the raceways, to avoid distortion effects. The specific invention underlying the coaction of the flat circumferential surfaces described will be more fully shown, described and claimed in a specification about to be filed.

Certain of the improvements just mentioned are disclosed and claimed in a pending application, Serial No. 450,356, filed July 10, 1942.

Various modifications or forms of the two sealing devices have been shown and described. The essential feature of the invention is the entity of three parts: a rubber connector having at one side a rigid metallic stiffener, with the spatial arrangements described for the flow of the rubber to obtain a fluid tight joint forming a fixed seal. The other feature, is to have an axially movable member adapted to form a rotatable sealing device, with flat planes contiguous to each other, and with a rubber connection in axial shear between the metallic stiffener and axially movable member.

Various other changes will be possible. We have described the invention, embodiments thereof, but we do not desire to be limited to details except as stated in the accompanying claims.

What we claim is:

1. In a fluid sealing device for antifriction bearings having relatively rotating members, one of said members having a holding groove and the other a sealing surface, the groove and sealing surface being within the lateral sides of the rotating members, and the sealing surface being in a plane at right angles to the axis of rotation, the combination of three members bonded to each other, the first member being rigidly supported by engagement with said holding groove and extending from that rotating member towards the other rotating member, the second member being axially movable and having a sealing surface in a plane at right angles to the axis of rotation and abutting the sealing surface of said other rotating member and radially spaced from the proximate end of the first member, and a third member radially disposed between the first and second members closing the space therebetween and of resilient rubber-like material of a length in contact with the second member greater than the radial space between the first and second members, to act in shear stress throughout first to resist movement of the second member in directions normal to the thrust of the second member in order to maintain contact of the sealing surfaces in substantially their original radial position with respect to each other and to maintain the fluid pressure surface area of the third member substantially constant, and secondly to absorb the axial vibrations of the second member to maintain its sealing surface in contact with the other sealing surface.

2. In a fluid sealing device for antifriction bearings having relatively rotating members, one of said members having a holding groove and the other a sealing surface, the groove and sealing surface being within the lateral sides of the rotating members, and the sealing surface being in a plane at right angles to the axis of rotation, the combination of three members bonded to each other, the first member being rigidly supported by engagement with said holding groove and extending from that rotating member towards the other rotating member, the second member being axially movable and having a sealing surface in a plane at right angles to the axis of rotation and abutting the sealing surface of said other rotating member and radially spaced from the proximate end of the first member, and a third member radially disposed between the first and second members closing the space therebetween and of resilient rubber-like material of a length in contact with the second member greater than the radial space between the first and second members, to act in shear stress throughout, and said second member having a fluid reaction surface area and said third member having a fluid reaction surface area slightly larger than that of the second member, to exert a differential pressure sealing contact of the sealing surface of the second member upon the sealing surface of the rotating member.

3. In a sealing device for antifriction bearings having relatively rotating members, one of said members having a groove and the other a sealing surface, the combination of a rigid metallic disc adapted to extend from one member towards the other, having one edge bevelled and the other end curved outwardly from the face of said disc, a rubber-like layer extending over the bevelled edge at one end of the disc and along the inner face of said disc including its curved end and bonded to the disc, said layer having an enlarged portion of rubber at said curved end in shear stress throughout terminating in a cylindrical bore, and a metallic sealing part having at one end a sealing surface adapted to face said sealing surface of one of said members and having a cylindrical extension of substantially the same diameter as that of the bore of said enlargement and bonded thereto, whereby when the bevelled edge of the disc with the rubber bonded thereto is placed in said groove, the rubber is dished to provide a seal, and when said sealing surfaces are placed against each other a seal is provided and the rubber enlargement acts in shear during the rotation of the members in respect to each other.

4. In a sealing device for antifriction bearings having relatively rotating members, one of said members having a groove and the other a sealing surface, the combination of a rigid metallic disc adapted to extend from one member towards the other having one edge bevelled and the other end curved outwardly from the face of said disc, a rubber-like layer extending over the bevelled edge of one end of the disc, an enlarged portion of rubber at the other end of the disc in shear stress throughout terminating in a cylindrical bore, and a metallic sealing part having at one end a sealing surface adapted to face said sealing surface of one of said members and having a cylindrical extension of substantially the same diameter as that of the bore of said enlargement and bonded thereto, whereby when the bevelled edge of the disc with the rubber bonded thereto is placed in said groove, the rubber is dished to provide a seal, and when said sealing surfaces are placed against each other a seal is provided and the rubber enlargement acts in shear during the rotation of the members in respect to each other.

DWIGHT E. BATESOLE.
GEORGE H. KENDALL.